Figure 1:
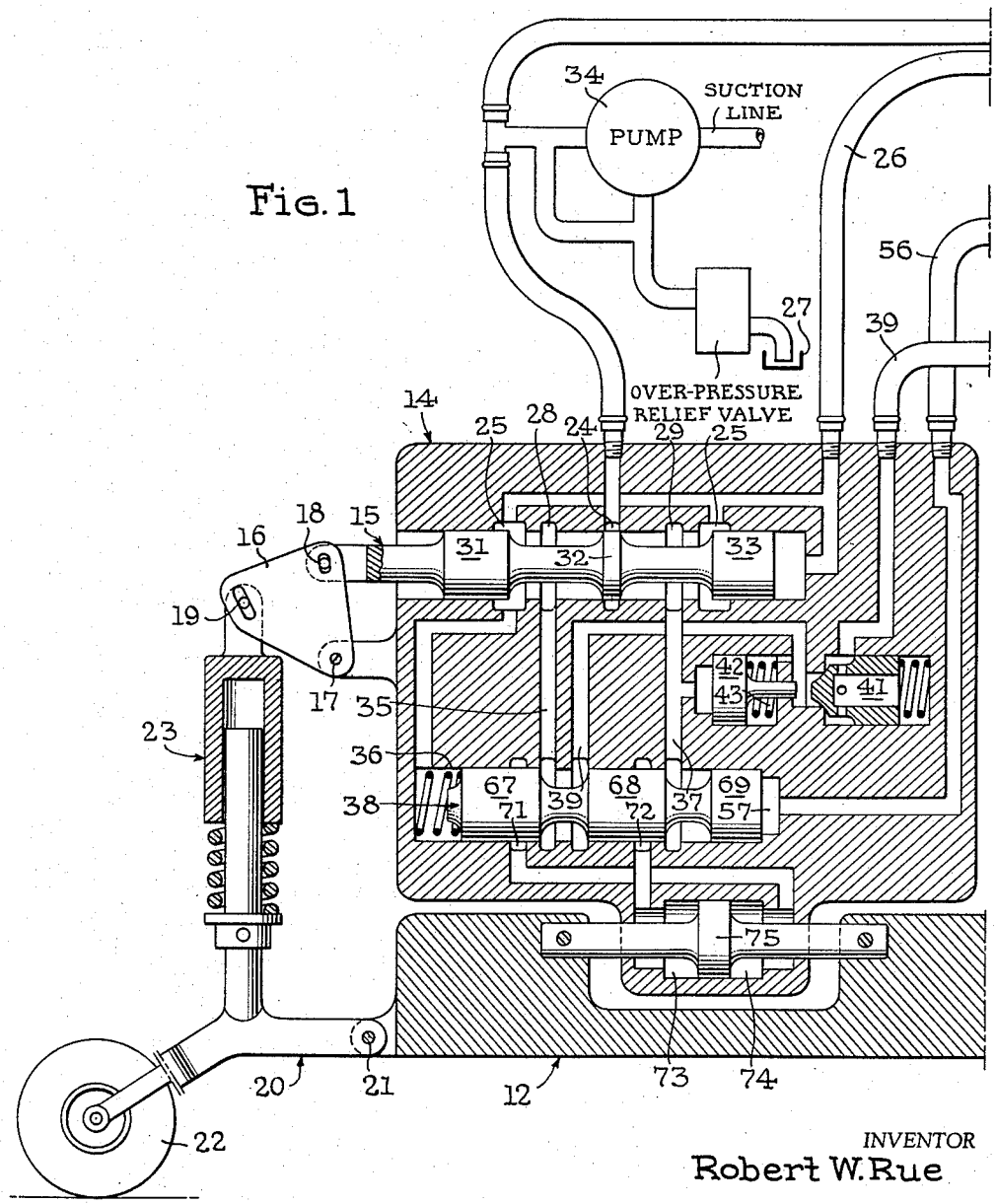

Nov. 24, 1959    R. W. RUE    2,913,878
VALVE SYSTEM

Filed Sept. 15, 1958    2 Sheets-Sheet 1

INVENTOR
Robert W. Rue

BY Dodge and Sons
ATTORNEYS

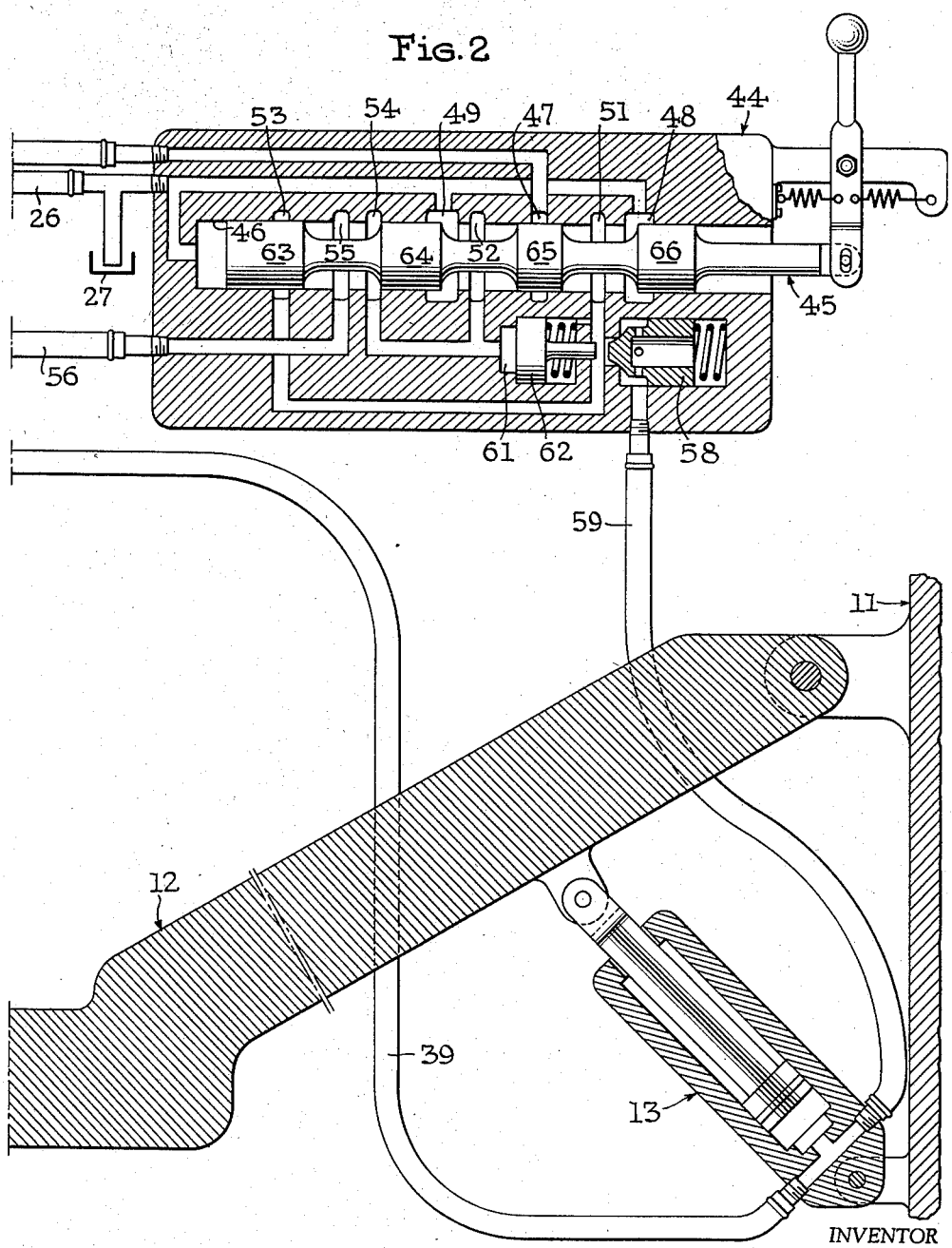

# United States Patent Office

2,913,878
Patented Nov. 24, 1959

2,913,878

VALVE SYSTEM

Robert W. Rue, Kalamazoo, Mich., assignor to The New York Air Brake Company, a corporation of New Jersey Application September 15, 1958, Serial No. 761,196

1 Claim. (Cl. 60—52)

This invention relates to servo valves. Particularly it relates to a servo system of the type in which a servo valve is actuated to maintain a member in a selected position relative to a reference surface or element. In the past, it has been possible to vary the null position by mechanical adjustment of the valve-actuating linkage. Such adjustment is complex and limited by the nature of the linkage structure.

According to the present invention, a null-adjusting motor is provided and its operation is controlled by a manually-operated control valve. The servo valve and the control valve are located in parallel-connected supply and exhaust connections of a controlled motor. Each valve is a more or less conventional three-position supply and exhaust valve. Flow to and from the null-adjusting motor is through the servo valve. This flow is blocked or established by a piloted selector valve which also reversely blocks or establishes flow through the supply and exhaust connection between the controlled motor and the servo valve. A motor shifts this selector valve between its two positions and this motor is controlled by the manually-operated control valve.

The invention will be described having reference to the accompanying drawings in which Figs. 1 and 2, placed side by side from left to right in the order stated, make up a schematic showing, mostly in axial section, of a complete system embodying the invention.

The system is shown as used with a harvesting combine which includes a tractor unit, part of which is shown at 11, and a header structure pivotally connected thereto and generally indicated by reference numeral 12. An hydraulic motor 13 reacts between the tractor unit 11 and the header 12. Guided on the header 12 is a valve body 14. A valve plunger 15 is shiftable in a valve bore in the body 14. The valve plunger controlling linkage includes a bell crank 16 pivotally connected with the valve body 14 at 17 and with the valve plunger 15 at 18 and with the position-sensing means at 19.

The position-sensing means includes a bell crank 20 pivotally connected to the header 12 at 21 and having a ground wheel 22. A telescoping shock absorbing link 23 is provided and prevents damage to the linkage when abrupt or excessive changes in elevation are encountered by wheel 22. This showing of the linkage is not to scale and the relative size of parts are not those used in actual practice. The design of the linkage is within the skill of the art, but the showing is believed adequate for the purpose of disclosing the invention. It will be evident that the invention is useful in other environments and the linkage may take different forms.

The servo valve bore has an annular supply chamber 24 and annular chambers 25 connected by conduit 26 to the sump 27. In the valve bore, intermediate the supply chamber 24 and corresponding chambers 25, are motor chambers 28 and 29. The valve plunger 15 includes three axially spaced lands 31, 32 and 33, as shown. The inner end of the valve bore is connected to the sump, as shown.

A pump 34 is connected to the supply chamber 24. This pump is preferably of the pressure-compensated variable delivery type in which displacement is reduced to zero as pressure increases above a predetermined maximum. It may also include the illustrated overpressure relief valve. A constant delivery pump could be used, but the preferred arrangement eliminates undesired heating.

The motor chamber 28, in the valve bore, is connected by passage 35 with a second valve bore 36 formed in the valve body 14. Motor chamber 29 is similarly connected with bore 36 by a passage 37. A motor-operated selector valve plunger 38 is slidable in the bore 36 and is spring-biased to the position shown in which it interconnects passages 35 and 39. Passage 39 is connected to the working space of the motor 13 through a check valve 41. A motor 42 receives pressure liquid from the passage 37 and is effective to unseat the check valve 41 when pressure in passage 37 overcomes the bias of motor spring 43.

Pump 34 also supplies pressure liquid to a control valve 44. Valve 44 is preferably mounted on the tractor unit and includes a valve plunger 45 reciprocable in valve bore 46. Formed in the valve bore 46 are a supply chamber 47, sump-connected chambers 48 and 49, and motor chambers 51 and 52. Motor chamber 51 is connected with chamber 53, and motor chamber 52 is connected with chamber 54. Between chambers 53 and 54 is a motor chamber 55 which, in turn, is connected by conduit 56 to the motor chamber 57 of the selector valve bore 36. Motor chamber 51 is also connected, through a check valve 58 and conduit 59, to the working space of motor 13. Motor chamber 52 is connected, as shown, with the working space 61 associated with motor piston 62. Piston 62 is spring-biased to the position shown but, when displaced against this bias, unseats the check valve 58. Valve element 45 includes four spaced valving lands 63, 64, 65 and 66.

The selector valve plunger 38 includes lands 67, 68 and 69. Formed in the valve bore 36 are motor grooves 71 and 72 connected with working spaces 74 and 73, respectively. These working spaces are formed in valve body 14 on opposite sides of an abutment 75 connected to the header 12.

With the parts in the position shown, the servo motor or ram 13 is inert and valve plungers 15 and 45 are in neutral position. When the ground wheel 22 is displaced upward by a change in ground level, the valve plunger 15 will move to the right, whereby pressure liquid is supplied from chamber 24 to chamber 28, thence through passages 35 and 39, past check valve 41 to the motor 13, thereby energizing the motor and raising the header 12. Check valve 58 remains seated, since chambers 61 and 52 are vented when valve plunger 45 is in its neutral position. As header 12 rises, the valve plunger 15 is returned to the left to its neutral position by the bell crank linkage. Hence the header 12 is elevated sufficiently to maintain the desired interval between header 12 and the ground. Downward movement of wheel 22 shifts the valve plunger 15 to the left and supplies pressure fluid from chamber 24 to motor chamber 29 and motor 42. Motor 42 moves against the bias of spring 43 and unseats check valve 41 whereby fluid is exhausted from the motor 13 through passage 39, past check valve 41, through passages 39 and 35 and chamber 28 to the sump-connected groove 25. Thus the header 12 is lowered, which movement returns the valve plunger 15 to neutral position when the proper interval is restored between the header 12 and ground.

When control valve plunger 45 is shifted either to the right or to the left, the motor chamber 57 of the selector valve receives fluid under pressure through conduit 56 and chamber 55. Chamber 55, when the control valve plunger 45 is shifted to the left, receives pressure fluid through chambers 51 and 53 and, when the valve plunger 45 is shifted to the right, it receives pressure fluid through chambers 52 and 54. When motor chamber 57 is pressurized, the selector valve plunger 38 shifts to the left and disconnects passage 35 from passage 39 and connects it instead with chamber 71 and working space 74. Simultaneously, passage 37 is connected with groove 72 and working space 73.

Assuming that valve plunger 45 is shifted to the left, motor chamber 51 is pressurized and motor 13 receives fluid under pressure from this chamber through check valve 58 and conduit 59. This will raise header 12, thus shifting valve plunger 15 to the left whereby pressure fluid enters motor working space 73 from supply chamber 24 through groove 29, passage 37 and groove 72. The pressure in space 73 shifts the valve body 14 to the left, thus restoring valve plunger 15 to neutral position. Follow-up movement of the valve body 14 terminates when valve plunger 45 is returned to neutral, allowing selector valve plunger 38 to resume its normal position.

It will be apparent that a new null position of the valve 14 and the header 12 has been established by this manipulation of valve 44, and valve plunger 15, under the control of ground wheel 22, will now maintain the header 12 in this new position. The working chambers 73 and 74 and abutment 75 make up what will be called a null-adjusting motor.

If valve plunger 45 is shifted to the right, the motor working space 61 receives fluid under pressure from the chamber 52. This unseats the check valve 58, whereby fluid flows from the motor 13 to the sump 27 through conduit 59, past valve 58, to motor groove 51 and to sump-connected groove 48. The resultant lowering of header 12 shifts valve plunger 15 to the right, whereby pressure fluid enters working space 74 through the passage 35 and groove 71.

This pressure in working space 74 shifts valve body 14 to the right, whereby the neutral position of valve plunger 15 is reestablished and a new null position of the valve 14 and the header 12 is reached when valve plunger 45 is returned to neutral position.

It will be seen that valve plunger 15 normally controls the motor 13 so as to maintain the selected interval between the ground and header 12. This position of header 12 is maintained despite varying differences between the ground level in the region of wheel 22 and in the region of the tractor wheels. In this way, a uniform header elevation is realized. Since the cutter element of the combine is mounted to the header 12, the grain will be cut uniformly. The interval between the header 12 and the ground can be varied at will by means of control valve 44. Thus the height of the stalk left after harvesting may be varied to suit the condition of the grain. This null adjustment can be made without stopping the combine.

No limitation to the precise embodiment of the invention is intended except as may be expressed in the terms in which it is claimed.

What is claimed is:

In combination, a support; a member carried thereby and movable relatively thereto; a controlled motor reacting therebetween and controlling said relative movement; parallel-connected supply and exhaust connections for said motor; a servo control valve in a first of said connections and having a neutral position and two motor-actuating positions in which respectively the controlled motor is oppositely actuated; a manually-operated control valve in a second of said connections and having a neutral position and two motor-actuating positions in which respectively said motor is oppositely actuated; a pump; a sump; flow passages between each control valve and the pump and between each control valve and the sump; a selector valve in the first connection yieldingly biased to a normal position in which it permits motor-actuating flow through the first connection, said servo valve including a valve plunger and a valve bore; a double-acting null-adjusting motor connected between said member and said valve bore; a selector valve motor effective when energized to shift said selector valve against said bias to a second position in which it blocks motor-actuating flow between the servo valve and the controlled motor and establishes actuating flow between the servo valve and the null-adjusting motor; actuating means for the servo valve responsive to the position of said member; a supply and exhaust passage for the selector valve motor; and valve means connected to be shifted by the manually-operated valve and serving to supply motor-actuating fluid to the selector valve only when said manually-operated control valve is in a position to actuate the controlled motor and to vent pressure fluid therefrom when that control valve is in neutral position, said null-adjusting motor when actuated serving to move the valve bore in a direction to reestablish the neutral position of the servo valve.

No references cited.